United States Patent [19]
Anderson

[11] Patent Number: 5,392,176
[45] Date of Patent: Feb. 21, 1995

[54] RECORDING/REPRODUCING DEVICE EMPLOYING DEVICE HOUSING AND PRINTED CIRCUIT BOARD AND ELECTRONICS AS STRUCTURAL AND FUNCTIONAL PART OF MEDIA DRIVE MOTOR AND THE MEDIA DRIVE MOTOR

[75] Inventor: Scott K. Anderson, Meridian, Id.

[73] Assignee: Hewlett-Packard Company, Palo Alto, Calif.

[21] Appl. No.: 97,812

[22] Filed: Jul. 26, 1993

[51] Int. Cl.$^6$ .............................................. G11B 17/02
[52] U.S. Cl. ............................. 360/97.01; 360/99.08; 310/156
[58] Field of Search ............... 360/97.01, 99.08, 98.07, 360/99.04; 310/156, 45, 83, 114, 179, 268

[56] References Cited

U.S. PATENT DOCUMENTS

| | | | |
|---|---|---|---|
| 4,985,652 | 1/1991 | Oudet et al. | 310/15 |
| 5,195,002 | 3/1993 | Sakurai | 360/99.08 |
| 5,240,003 | 8/1993 | Lancee | 310/162 |
| 5,289,069 | 2/1994 | Hasagawa | 310/156 |

FOREIGN PATENT DOCUMENTS

0494033A1  7/1992  European Pat. Off. .

Primary Examiner—A. J. Heinz
Attorney, Agent, or Firm—E. F. Oberheim

[57] ABSTRACT

A disk drive in which the disk spindle motor for a rotatable recording/reproducing media has a printed circuit stator winding on a printed circuit board within the disk drive housing, fitted between axially spaced circular flanges of a bobbin-shaped motor rotor. Alternately poled, equally circumferential spaced, axial permanent magnet fields between the axially spaced circular flanges link radially disposed printed circuit winding sections. Electronic elements on the printed circuit board are linked internally of the housing with the magnetic head and the actuator motor winding which powers the actuator for moving the magnetic head to different radial locations on the rotatable media. Bi-polar energization of the stator winding of the disk spindle motor is under the control of a commutating circuit controlled by a Hall sensor linked by the axial permanent magnet fields. Motor speed control is achieved by controlling the voltage level of the commutating circuit or by controlling the duty cycle of the voltage coupled to the stator winding. The disk drive design integrates the disk drive housing and the printed circuit assembly and its electronics with the disk spindle motor within the disk drive housing.

18 Claims, 6 Drawing Sheets

RECORDING/REPRODUCING DEVICE EMPLOYING DEVICE HOUSING AND PRINTED CIRCUIT BOARD AND ELECTRONICS AS STRUCTURAL AND FUNCTIONAL PART OF MEDIA DRIVE MOTOR AND THE MEDIA DRIVE MOTOR

TECHNICAL FIELD

This invention relates to disk recording/reproducing devices and more particularly to such devices of a structural design which simplifies the fabrication of parts, and sub-assemblies, simplifies assembly, increases product yield, reduces product costs, and, importantly, embodies structural design features which increase mechanical volumetric efficiency by functionally integrating parts which are conventionally, physically separated in an assembly stack and thereby not functionally related to reduce the profile of the device.

BACKGROUND OF THE INVENTION

Recording/reproducing devices typically comprises a rotatable disk media structure which includes a disk powered by a disk spindle motor, and, an actuator structure which comprises a transducer/actuator arm assembly on a movable support and powered by an actuator motor, for moving the transducer radially of the disk. The actuator may be either of the rotary or linear type and functions under servo controlled actuator motor power to move the transducer to different radial positions on a disk. In a disk drive this mode of operation is referred to as a track seeking and track following operation.

In a disk drive, the memory disk structure comprises one or more disks in a memory disk assembly, concentrically mounted about a disk spindle hub which is driven by a radial gap disk spindle motor having a stator mounted to the base of the disk drive housing. In the memory disk assembly, one or more disks are clamped in a stack about the disk spindle hub, multiple disks being axially spaced by ring spacers of sufficient thickness to space the disks to clear individual actuator structures therebetween. The stator of the disk spindle motor is assembled within the disk spindle hub. The disk spindle hub functions as the motor rotor.

As disk drives are reduced in size, such motor designs in the memory disk structure become impractical in both radial and axial dimension. As the radius is reduced adequate motor torque is no longer available. Design efforts to increase motor torque by increasing the radius of the motor and reducing the axial dimension, have resulted in radial gap disk spindle motors having relatively thin-flat, rotors of sufficient diameter so that motor torque requirements may be met. The stator structure with its windings is disposed within the motor rotor. The large diameter of the motor rotor of this type of disk spindle motor, in relation to the dimension of the memory disk(s), prevents its disposition within the memory disk stack, so the memory disk(s) and the disk spindle motor are axially stacked. This motor design has a low profile and has resulted in improvement in motor torque. The design requires the axial stacking of the disk spindle motor and the memory disk(s), rather than concentrically disposing the disk stacks about the motor, consequently there is some loss in volumetric efficiency. There remains not only a need for further reductions in the thickness or profile of the disk spindle motor but also a need to reduce the thickness of the recording/reproducing device.

SUMMARY OF THE INVENTION

The best mode for practicing this invention is embodied in a rotary actuator type of disk drive which is used herein as an exemplary basis for describing this invention. The application of this invention to linear actuator types of disk drives and to types of rotary actuator disk drives other than that specifically presented herein as, for example, any disk recording/reproducing device involving a rotating media, is believed to be within the capabilities of those of ordinary skill in the art.

With decreasing form factors, higher information storage volumes, and lower drive prices, a point is reached where extensive manual participation in the fabrication and assembly of parts is no longer cost effective, and, in some respects, not even feasible. This invention provides a new approach to the configuration of the disk drive, particularly with regard to the spindle motor, per se, and its integration into the drive, which reduces the parts count, provides simplified part configuration adapted to automatic fabrication and assembly, minimizes the need for manual intervention in fabrication and assembly processes of the disk drive, reduces the requirements for testing, increases product yield and results in a durable product suited to its application and environment.

A disk spindle motor and its integration in the disk drive according to this invention, employs unique structural implementations to reduce the count of separate parts required for disk drive assembly and to adapt the parts to automatic fabrication and assembly techniques. Implementation is achieved by integrating the disk spindle motor with the disk drive housing and the printed circuit assembly. An axial gap, permanent magnet, disk spindle motor having a bobbin-shaped motor rotor is employed. The bobbin-shaped motor rotor is rotatabley journaled in the disk drive housing on the housing base and comprises a pair of circular, axially spaced, rotor plates on a hub. Discrete, alternately oppositely poled axial magnetic fields are produced between the circular rotor plates. The planar disk spindle stator motor winding and its circuits are fabricated as part of a printed circuit board assembly on the base of the disk drive housing. The printed circuit board assembly is mounted on the base within the disk drive housing and has a portion carrying the planar winding fitted between the axially spaced circular rotor plates. The planar windings may be fabricated of formed wires but are preferably printed circuits. This significantly reduces the need for manual intervention in the part fabrication and assembly process. This aspect of the unique structural design, for given form factors and in comparison with conventional designs, reduces the profile dimension of the disk spindle motor, both as to the motor, per se, and as to the removal of the printed circuit assembly board from a location external to and beneath the disk drive to a location in existing space within the disk drive housing, which increases mechanical volumetric efficiency.

In greater particularity, the base of the disk drive housing and the electronics of the printed circuit assembly are incorporated as integral parts of the disk spindle motor within the disk drive housing. The windings of the disk spindle motor are printed circuits on the printed circuit board assembly. This implementation consolidates the electronics and the electrical functions into one common printed circuit substrate. The printed circuit substrate is of a thin, low-cost material, fiber glass, polyimide, for example, which is bonded to the disk drive base within the housing along with the memory disk structure and the rotary actuator structure. In addition to the printed circuit windings for the disk spindle motor, the integrated circuits, connectors and discrete circuit elements are bonded to the printed circuit board or substrate.

The use of an axial gap disk spindle motor, integrated with the disk drive base, and provided with a printed circuit winding, reduces the disk spindle motor profile and brings the printed circuit assembly inside the disk drive housing, eliminating the additional dimensional increment to the disk drive profile normally consumed by the printed circuit assembly board. These cumulative reductions in structural profile reduce the overall profile of the memory disk structure and the disk drive housing, increasing the mechanical volumetric efficiency of the disk drive. Now all connections between the disk drive and the electronics are made within the disk drive housing, eliminating the complications of electrical connections extending through the housing to external printed circuit board assemblies and the potential of such connections for contaminant leaks.

This unique structural implementation of this aspect of the disk drive, embodies fewer parts, embodies parts of configurations which are adapted for automatic fabrication and assembly, minimizes the need for manual intervention in the fabrication and assembly process, increases the product yield and permits cost effective fabrication of disk spindle motors for smaller form factor disk drives.

BRIEF DESCRIPTION OF THE DRAWINGS

A better understanding of this invention will be had by reference to the following specification when considered in conjunction with the accompanying drawings, in which.

DESCRIPTION OF THE PREFERRED EMBODIMENTS

Figure 1:
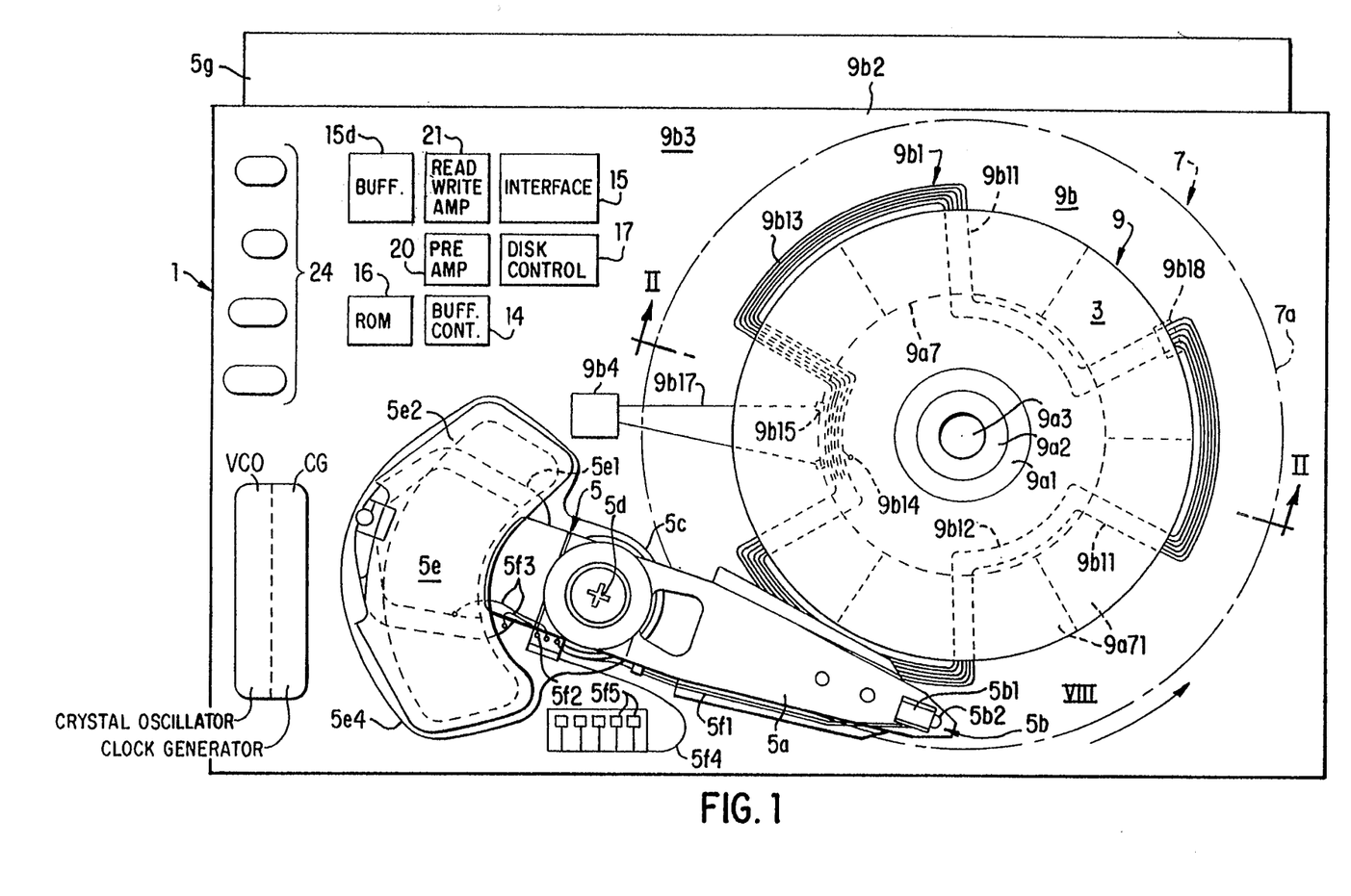
FIG. 1, is a plan view of a disk recording/reproducing device, as in a disk drive, comprising a memory disk structure and an actuator structure, embodying the principles of this invention.

A disk drive embodying the principles of this invention and representing the presently known best mode for practicing this invention, is illustrated in FIG. 1. The disk drive housing has a base 1 which supports a memory disk structure 3 including an improved low profile, disk spindle motor, and a rotary actuator structure 5, which items together comprise the principle parts of the disk drive. The base 1 forms part of the disk drive housing and constitutes a primary support for the parts of the disk drive.

Memory Disk Structure

Figure 2:
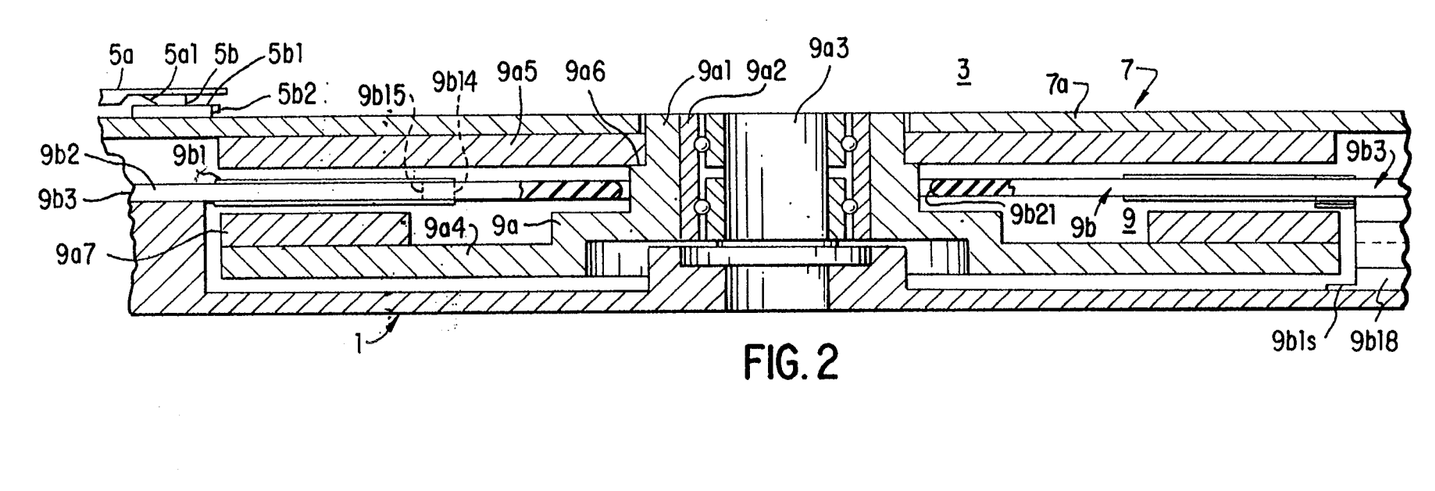
FIG. 2, is a sectional view of the memory disk structure of FIG. 1, viewed in the section plane taken on the section line II—II of FIG. 1.

The memory disk structure 3 comprises a memory disk assembly 7, shown only in dot-dash outline in FIG. 1, and a disk spindle motor assembly 9. As seen in FIG. 2, which is a view in the section plane II—II of FIG. 1, the memory disk assembly 7, in this example, has only one memory disk 7a. The disk spindle motor 9 comprises a bobbin-shaped motor rotor 9a and a motor stator 9b, including a printed circuit stator winding 9b1. A hub 9a1 of the motor rotor 9a is journaled by a coaxial bearing pair 9a2, on a disk motor spindle 9a3, secured in the base 1. Adhesive bonding or press fitting may be employed to secure the disk motor spindle 9a3 in the base 1. More than one memory disk 7a may be employed in the memory disk assembly 7 to enlarge the disk drive data capacity.

The bobbin-shaped disk motor rotor 9a is fabricated of a magnetizable material, such as soft steel or stainless steel. Any material of low magnetic coercivity and high permeability may be used. The bobbin-shaped disk motor rotor 9a comprises a pair of axially spaced circular rotor plates 9a4 and 9a5 on the hub 9a1. The lower rotor plate 9a4 is preferably integral with the rotor hub 9a1, since that construction eliminates one part and an assembly step. The upper rotor plate 9a5 is seated upon a shoulder 9a6 of the hub 9a1 which determines the axial spacing of the rotor plates 9a4 and 9a5. Bonding or press fitting secures the rotor plate 9a5 to the hub 9a1. A ring-shaped permanent magnetic 9a7 is concentrically disposed of the disk motor spindle 9a3 upon the peripheral interface of the rotor plate 9a4 where it is adhesively bonded. The memory disk 7a is adhesively bonded to the upper surface of the upper rotor plate 9a5. To guarantee flatness of the memory disk when in place, the upper surface of the rotor plate 9a5 is preferably lapped prior to its assembly on the hub and attachment of the memory disk 7a thereto, The stator 9b of the disk spindle motor 9 comprises a flat printed circuit stator winding 9b1 on a thin substrate 9b2 of a printed circuit board assembly 9b 3. The thin substrate 9b2 of the printed circuit board assembly 9b3 is secured to the base 1 within the housing along with the memory disk structure 3 and the actuator structure 5. The substrate 9b2 is installed prior to securing the upper rotor plate 9a5 on the rotor hub 9a1. A circular opening 9b21 in the substrate clears and encircles the rotor hub 9a1. In this position, the substrate 9b2 occupies a position between the rotor plates 9a4 and 9a5 of the motor rotor 9a, placing the printed circuit motor stator winding 9b1 in the axial gap between the ring magnet 9a7 and the innerface of the upper rotor plate 9a5, in which position it is linked by the alternately poled, axial magnetic fields of the ring magnet 9a7.

As seen in FIG. 1, the stator winding 9b1 is a printed circuit layout on the substrate 9b2 of the printed circuit board assembly 9b3. This winding 9b1 comprises radially disposed printed circuit winding sections 9b11 which cross the ring magnet 9a7 in a radial direction at six equally circumferentially spaced locations. These radial winding sections 9b11 are part of a continuous printed circuit winding pattern including inner circumferential winding sections 9b12 and outer circumferential windings sections 9b13. The winding pattern is printed in exact registration on both sides of the substrate 9b2, which doubles the winding turns and the available motor torque. The inner end of the printed circuit winding on the top surface of the substrate 9b2 is connected by a via 9b14 to the inner turn of the printed circuit winding on the bottom surface of the substrate 9b2. The end of the outer turn of the bottom winding is brought to the upper surface of the substrate 9b2 by a via 9b15. The vias 9b14 and 9b15 are connected by printed circuit traces 9b16 and 9b 17 to a spindle driver 9b41, FIG. 3, FIG. 7, of an actuator/spindle driver 9b4 on the printed circuit board substrate 9b2.

The ring magnet 9a7 is axially spot magnetized in adjacent alternate polarities, in six equally circumferentially spaced locations 9a71, as seen in FIG. 1. Flux coupling between the adjacent, alternately axially poled, permanent magnet spots 9a71, in the ring magnet 9a7, is in a circumferential direction in perpheral portions of the motor rotor plates 9a4 and 9a5. The axial gap in which the printed circuit winding 9b1 is positioned is defined between the upper surface of the ring magnet 9a7 and the peripheral portion of the inner surface of the upper rotor plate, 9a5.

The operation of the disk spindle motor 9 is similar to that of a flat coil linear motor. In this case, the linear motor is wrapped in a circle and closed upon itself. An axial gap flux path is set up in the air gap between the ring magnet 9a7 and the rotor plate 9a5. The permanent magnet field in this flux path links the radial winding sections 9b11 of the printed circuit stator winding 9b1, which are disposed in the axial gap. Current in the radial winding sections 9b11 of the printed circuit stator winding 9b1 is at right angles to the permanent magnet field and at right angles to the tangential component of motor rotation. This sets up a magnetically coupled tangential force in the motor rotor 9 causing rotation of the rotor.

Figure 6:
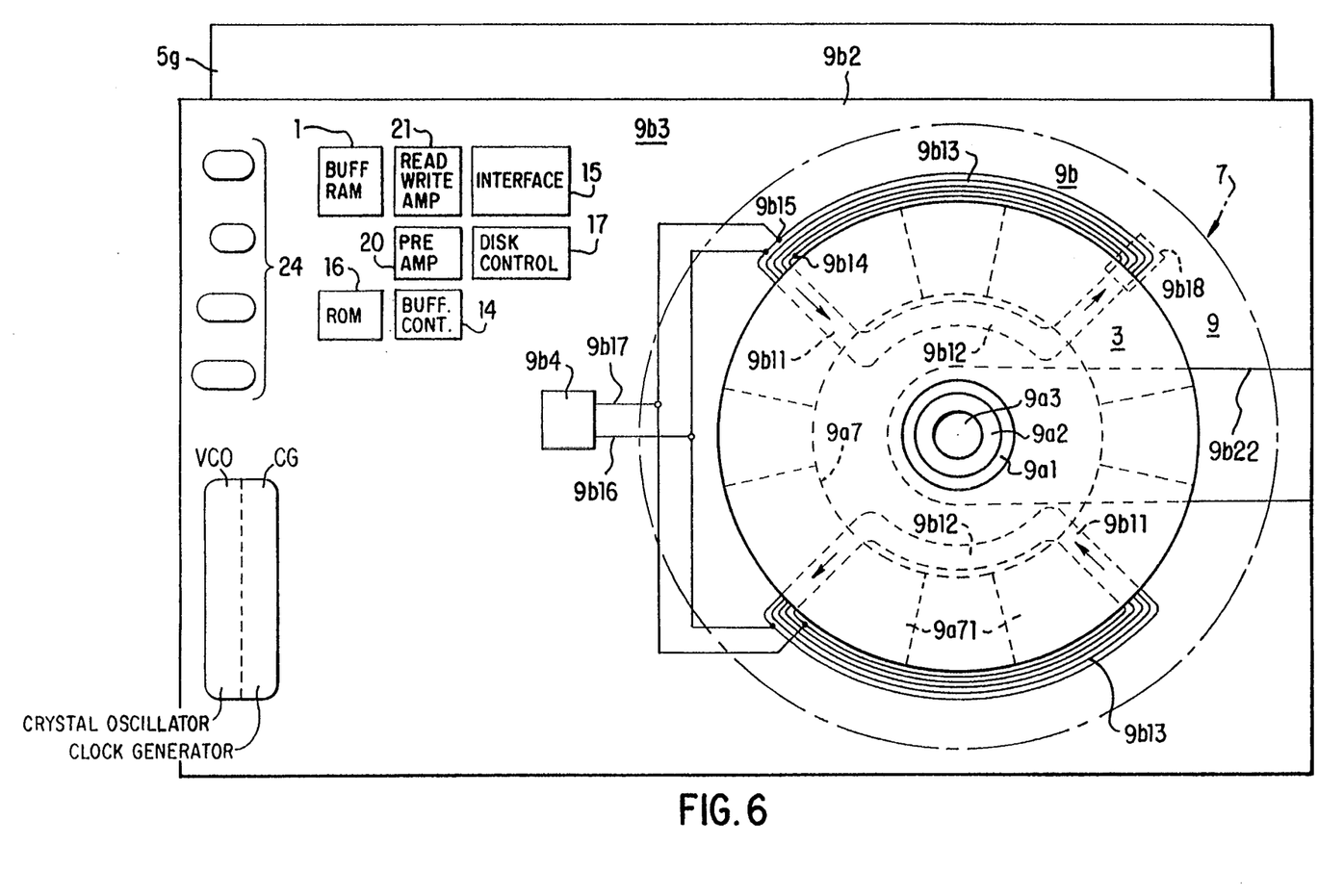

At least two permanent magnet poles 9a71 are required for the disk spindle motor 9 to function. Four poles are shown in FIG. 6. More than the six poles 9a71 shown in FIG. 1 also may be employed. As described, the axial polarity of these individual poles 9a71 alternates around the permanent magnet ring 9a7. The current in one radial winding section 9b11 flows away from the hub 9a1, while the current in an adjacent radial winding section 9b11 flows towards the hub 9a1. Since the radial winding sections 9b11 of the printed circuit winding 9b1 cross the alternately poled axial flux paths in the axial gap, the force generated by the interacting flux fields is consistently in the same direction. As the motor rotor 9a rotates and the spot magnets approach and come into proximity to the circumferentially adjacent radial winding section 9b11, the spindle driver section 9b41 of the actuator spindle driver 9b4, coupled to the printed circuit winding 9b1, reverses the winding voltage so as to maintain the tangential force in the same direction. The switching can be initiated or timed by means of a Hall sensor 9b18 disposed in a peripheral position, FIG. 1, FIG. 2, with respect to the ring magnet 9a7, at the location of a radial winding section 9b11, FIG. 1, to sense the axial magnetic field at that location. As a junction of the alternately axially poled magnetic spots 9a71 in the ring magnet 9a7 approaches and crosses the Hall sensor 9b18, the Hall sensor produces a signal coupled to the spindle driver 9b41, which indicates that polarity reversal of the winding current is required to maintain a unidirectional magnetic force couple. Alternatively, the back electromotive of force of the winding 9b may be sensed as the source of a signal for timing reversing of the winding current.

Figure 3:
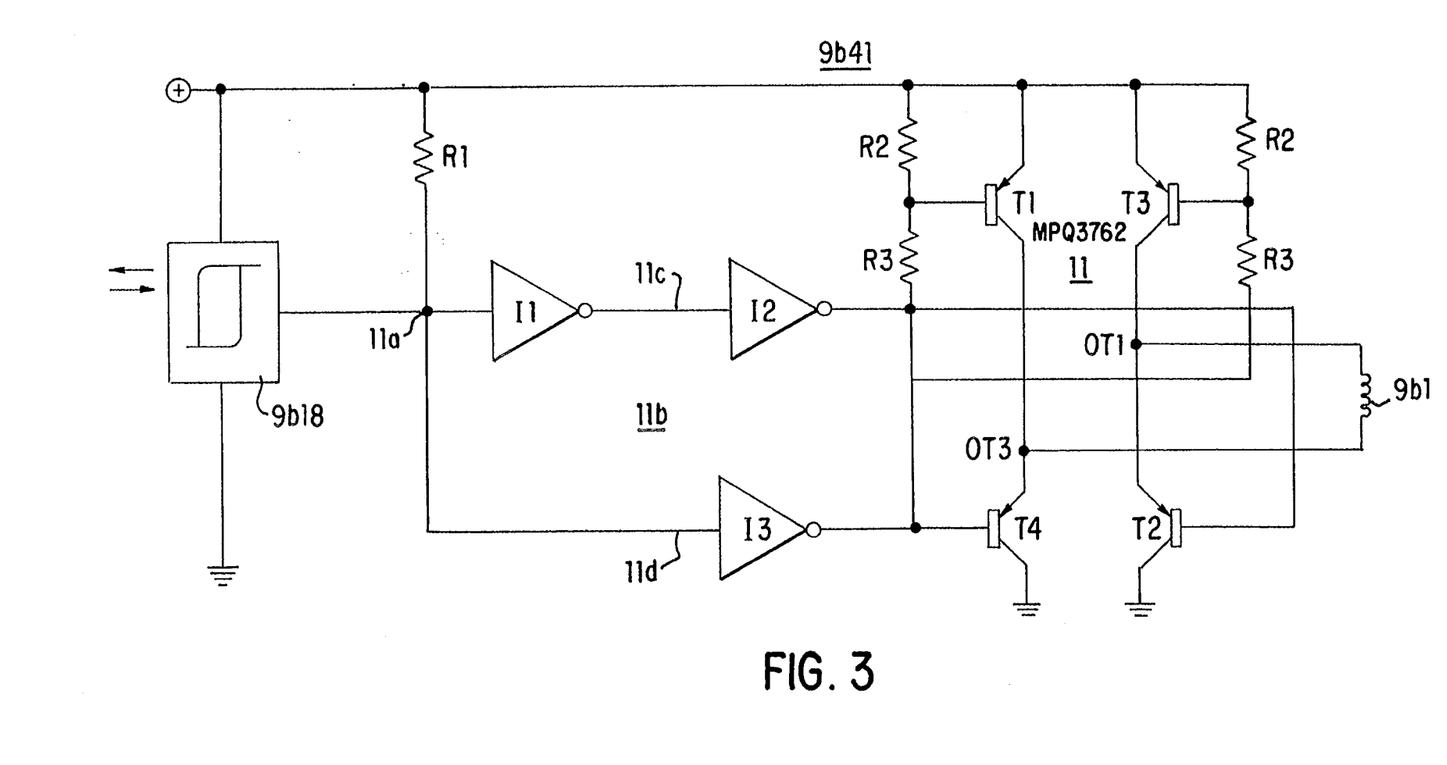
FIG. 3 illustrates a circuit for controlling the excitation of the winding of the disk spindle motor.

The spindle driver, portion 9b41 of the actuator spindle driver 9b4, of FIG. 1, is illustrated in detail in FIG. 3 as a commutation circuit for reversible switching of the current in the printed circuit winding 9b. The commutation circuit comprises a transistor bridge circuit 11 connected between a supply of fixed positive voltage V and ground. Transistor pairs, T1, T2 and T3, T4, are connected in opposite legs of the bridge circuit 11. The printed circuit motor winding 9b1 is connected to a pair of output terminals OT1 and OT2, of the bridge circuit 11. The transistor pairs, T1, T2, and T3, T4, are switched between two states, which reverses the direction of the current through the printed circuit winding 9b1. The Hall sensor 9b18 is energized by the positive voltage supply in a circuit between the positive voltage terminal V and ground. The input to the Hall sensor 9b18 is a reversing magnetic field to which it is subjected as the motor rotor 9a7 rotates. This is indicated in FIG. 3 by the oppositely directed arrows at the left of the Hall sensor. The output of the Hall sensor 9b8 is switched between two different voltage values or voltage states of the same polarity in synchronism with the reversing of the permanent magnet fields which it senses in its position at one of the radial winding sections 9b11, FIG. 1.

In greater detail, the output of the Hall sensor 9b18, is coupled to a terminal 11a which is coupled by a pullup resistor R1 to the positive voltage supply V.. The voltage seen at the terminal 11 a is either a high state or a low state and varies-synchronously with the direction of the flux sensed by the Hall sensor 9b18. The terminal 11 a is the input terminal to a commutation control circuit 11 b for the bridge circuit 11. The commutation control circuit 11b comprises two commutating circuit branches 11c and 11d coupled in parallel to the input terminal 11a. The branch 11c comprises the series connected inverter amplifiers I1 and I2. The branch 11d comprises a single inverter amplifier I3. Thus, the output voltages of the inverters I2 and I3 each vary between two voltage states of the same polarity, in opposite phases, as the voltage at the input terminal 11a is switched between its two voltage levels by the Hall sensor 9b18. The output voltage of the inverter I2 is the base voltage for the transistor pair T1, T2, and the output voltage of the inverter I3 is the base bias voltage for the transistor pair T3, T4. The bias voltages for the transistors T1 and T3 are derived from taps in the respective voltage dividers, each of which comprises resistors R2 and R3, under control of the respective inverters I2 and I3. When the output of the inverter I2 is in the lower of its two voltage states, the transistor pair T1, T2 conducts. When the output voltage of the inverter I3 is in the lower of its two voltage states, the transistor pair T3, T4 conducts. With a fixed voltage V, applied to the bridge circuit, the motor speed is fixed.

Control of the speed of the disk spindle motor 9 is achievable either by controlling the voltage coupled to the bridge circuit, which controls the magnitude of the voltage across the windings 9b1, or, by controlling the duty cycle of the on states of transistors T1, T2, T3 and T4. Both types of control may be regulated to maintain a substantially constant motor speed, by timing pulse generation derived from the memory disk by the magnetic head, to control the amplitude of the voltage supplied to the bridge circuit or to modulate the duty cycle of a fixed voltage coupled to the bridge circuit 11. Such speed regulation forms no part of this invention.

Figure 4:
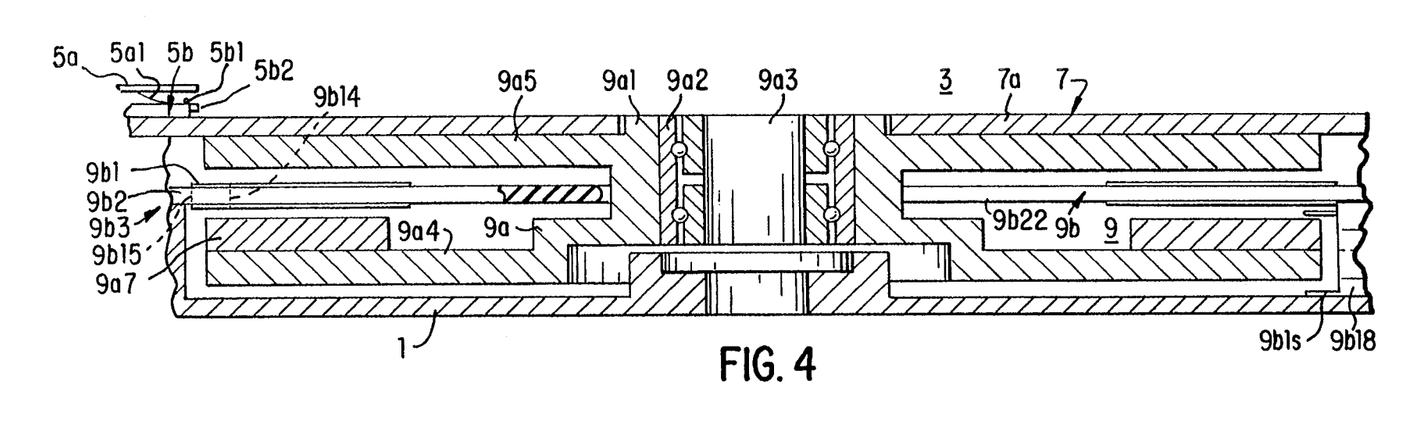
FIG. 4, depicts a variation of the memory disk structure of FIG. 2.

A modification of the bobbin-shaped rotor 9a of the disk spindle motor assembly 9 is illustrated in FIG. 4. In the fabrication of disk drives of small form factor, 1.8, 1.3, and less, a reduction in parts count and a reduction in the assembly steps, particularly with respect to fabricating small parts, is essential. To this end, FIG. 4, which again is a sectional view in the section plane II—II of FIG. 2, illustrates a bobbin-shaped motor rotor 9a of single piece construction. In the small form factors referenced above, it is easy and convenient to fabricate such a part as a single piece, as by a screw machine operation, or a molding operation for example. Accounting for separate motor rotor parts is eliminated and at least one difficult assembly step is eliminated.

Figure 5:
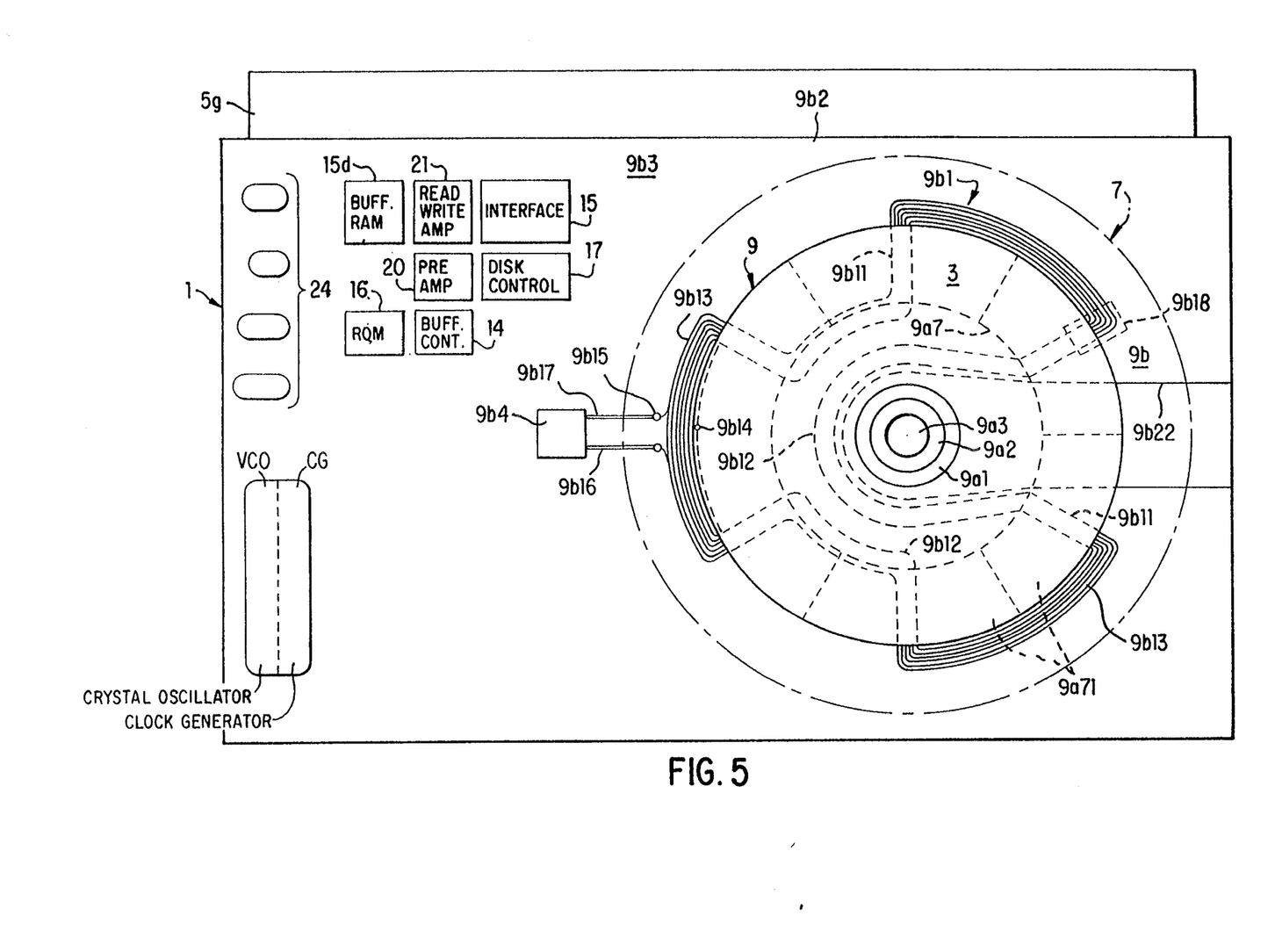
FIGS. 5 and 6 are plan views of respective disk recording/reproducing devices of the type of FIG. 1, illustrating in FIG. 5 a different disk spindle motor printed circuit winding orientation, and, in FIG. 6, illustrating a different disk spindle motor printed circuit winding configuration, and FIG. 7 diagrammatically depicts a disk drive system embodying servo and data processing functions, illustrating electrical connections among essential circuit elements.

The use of the single piece bobbin-shaped motor rotor requires a different disk drive assembly process than that employed in assembling the disk drives of FIGS. 1 and 2, further requiring a modification of the printed circuit assembly to slip between the upper and lower rotor plates 9a4 and 9a5 of the motor rotor. As seen in FIG. 5, the printed circuit assembly is slotted from the right edge, as viewed. The winding orientation of FIG. 1 would not permit such a slot, but by rotating the winding 9b1 through an angle of 60° on the substrate 9b2 and routing the winding section 9b13 around the rotor hub 9a1, it is possible to extend the slot 9b22 inboard to clear the rotor hub 9a1. Excitation of this winding section is as describe in connection with FIG. 1 using the commutation circuit of FIG. 3.

A further variation of the winding configuration on the slotted substrate 9b2 is illustrated in FIG. 6. This winding comprises two separate winding sections 9b1a and 9b1b which are positioned on each side of the slot. Four radial winding sections 9b11 are provided in this winding pattern, 2 in each of the separate winding sections 9b1a and 9b1b. Four equally spaced, alternately axially poled, permanent magnet spots 9a71 are provided in the ring magnet 9a7 to produce the axial magnetic fields. As in the case of the windings of FIGS. 1 and 5, the current in the radial winding sections 9b11 must be reversed synchronously with the movement of the magnetized spots 9a71 there pass. To accomplish this, the separate winding sections 9b1a and 9b1b are connected in parallel to the spindle driver 9b41, so that current reversal takes place simultaneously in all of the radial winding sections 9b11. The commutating circuit or FIG. 3 is applicable here. As in the winding configuration of FIGS. 1 and 5, the separate winding sections 9b1a and 9b1b of FIG. 6, being connected in parallel to the output terminals OT1 and OT2, of the bridge circuit 11, of FIG. 3, are simultaneously switched to achieve reversing of the current flow in the radial winding sections 9b11.

Actuator Structure

Figure 7:
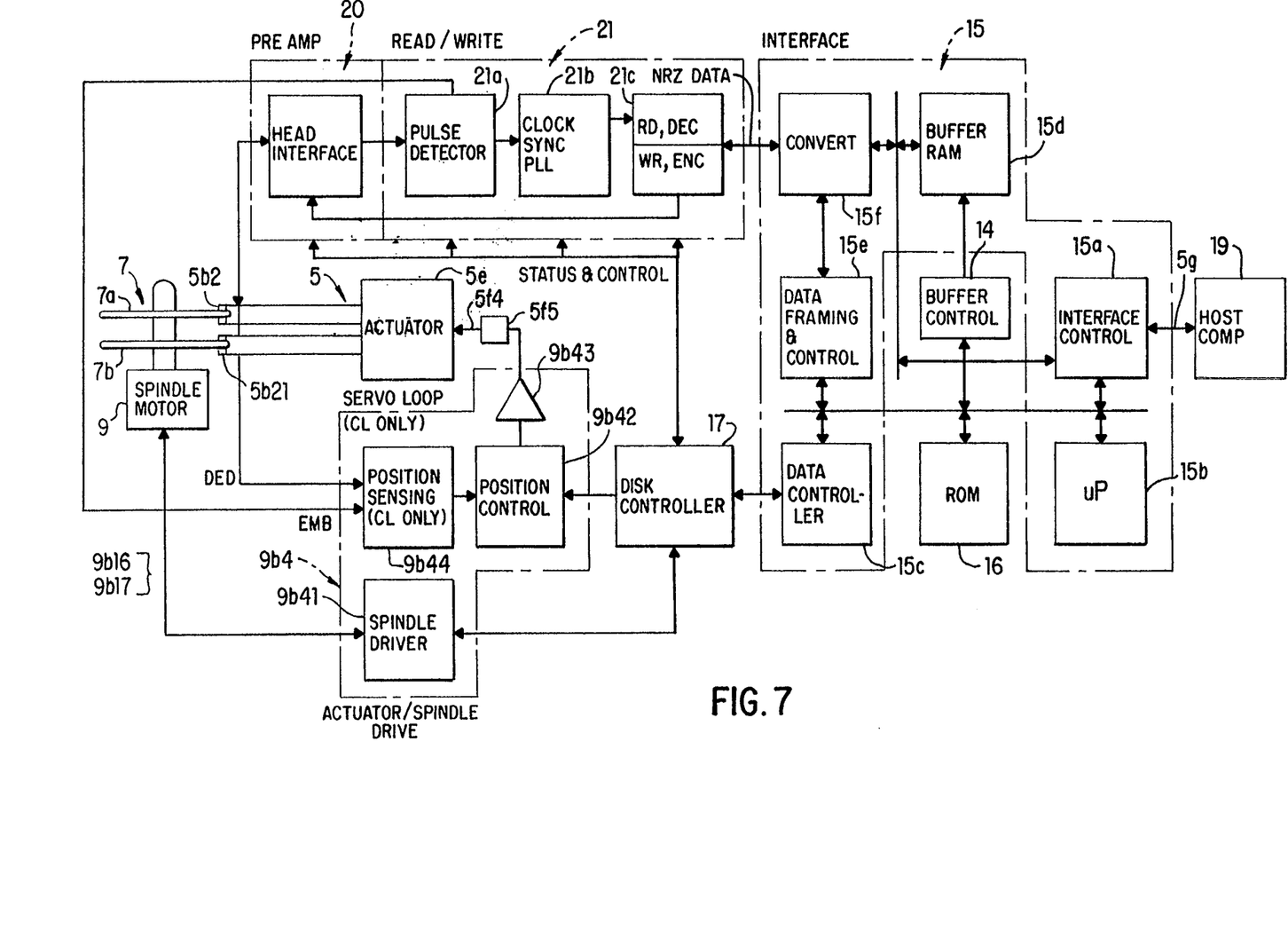

As seen in FIG. 1, the rotary actuator arm structure 5 comprises at least one flexible arm 5a. The actuator arm 5a overlaps the upper surface of the memory disk 7a. A gimbal spring 5a1, FIG. 2, mounts a transducer assembly 5b on the distal end of the flexible arm 5a. The transducer assembly 5b comprises a slider 5b1 and a read/write element such as a magnetic head 5b2. FIGS. 2 and 4 show the relationship of the disk drive parts in which the memory disk assembly 7 comprises a single disk 7a. Although an actuator/transducer assembly is shown only at the top surface of the memory disk 7a, in FIGS. 2 and 4, it will be appreciated that a second such assembly may be positioned at the bottom surface of the memory disk 7a. Also this invention may be practiced employing more than one memory disk, as seen in FIG. 7.

The actuator arm structure 5 is mounted to a cylindrical hub 5c, FIG. 1, journaled on a spindle 5d secured to the base 1.

The rotary actuator structure 5 comprises an axial gap actuator motor 5e which has a flat coil 5e1 secured to the actuator structure at the hub 5d. The coil 5e1 swings in a planar arcuate path about the spindle 5d in the axial magnetic field between upper and lower stator plates 5e2, only the upper plate being visible in FIG. 1, of a permanent magnet actuator motor stator 5e3 secured to the base 1. Bi-directional energization of the coil 5e1 controls track seeking and track following functions of the rotary actuator assembly 5, employing the magnetic head in the servo loop as the track sensor. An opening 5e4 is provided in the printed circuit board assembly 9b3, as seen in FIG. 1, to permit mounting of the permanent magnet stator 5e3 of The axial gap actuator motor 5e directly to the base 1.

Wires 5f1 extending along an edge of the flexible arm 5a connect the magnetic head 5b2 to individual bonding pads 5f2 at the hub 5c of the rotary actuator 5. Other wires 5f3 connect the coil 5e1 of the axial gap actuator motor 5e to other individual bonding pads 5f2 at the actuator hub 5c. A flat flexible cable 5f4 having pluralities of circuit traces therein connects the bonding pads 5f2 at the actuator hub 5c to other bonding pads 5f5 on the printed circuit board assembly 9b3. From this location, circuit traces (not shown) in the printed circuit board are employed to connect the magnetic head 5b2 to a read/write channel including a preamplifier 20 and a read/write amplifier 21, are also FIG. 7, and the coil 5e1 of the actuator motor 5e to the spindle/actuator driver 9b4, see also FIG. 7, on the printed circuit board assembly 9b3, for controlling the positioning magnetic head 5b2.

All of these circuit connections, which in conventional drives in which the printed circuit board is mounted externally of the disk drive housing, usually to the bottom side of the disk drive housing, are now contained internally of the disk drive housing, eliminating any necessity for electrical cable connections to be passed through openings and connectors in the housing to the printed circuit board and the electrical elements thereon. A connector 5g disposed at the side of the disk drive housing provides electrical connections between the disk drive and a host computer external to the disk drive.

All of the electronic components and systems for controlling the disk drive in track seeking and track following modes of operation in the performance of read/write functions, are mounted to the printed circuit board assembly 9b3, and, by the unique organizational concept disclosed are functionally and structurally integrated, within the disk drive housing 1, with the disk spindle motor 9 and the actuator 5.

All data recorded on the memory disk 7a is recorded as to location by track and track sector. There are two methods of locating tracks, one is by track count in a given radial direction from a present track and the other is by track number recorded in individual tracks.

A single magnetic head, as shown in FIG. 1, reads both servo code, called embedded servo code, for track seeking and for track following purposes, and reads or writes data in the tracks in data sectors between the bursts of servo code. Where multiple disks in a disk stack are employed with a transducer for each disk surface, as seen in FIG. 7, one disk surface, the bottom surface of the bottom disk may be dedicated to servo code, in which case, a magnetic head 5b21 is dedicated to the servo code. Timing for these differing functions is provided by the interface 15 initiated by signals from the magnetic head responding to a start of servo code recording or a start of data recording in an addressed sector in a selected track.

FIGS. 1 and 4 relate the physical and functional aspects of this invention, depicting the electronic components in block form. In practice, these blocks comprise electronic circuit chips or other discrete circuit element, which, as seen in FIG. 1, are strategically placed on the substrate of the printed circuit board assembly 9b3 and connected by printed circuit traces (not detailed) to function as component parts of the disk drive control system. The control system, as seen in FIG. 7, depicts the connections among the several system components. The system functions to provide bi-directional communication between a host computer 19 and the disk memory file or drive 5,7.

As seen in FIG. 7 (refer also to FIG. 1), the host computer 19 is connected to an interface circuit 15 via the connector 5g. Requests by the host computer 19 to read data from the disk memory 5,7 or to write data to the disk memory 5,7, are received at an interface control 15a of the interface 15 and are processed by the interface 15 into a track address and track sector address where data is to be retrieved or written. Such processing is primarily performed by a micro-processor 15b, accessing an external read only memory 16 (ROM), as needed. A track address in the form of a track count or a track number, depending upon which form of track identification or address is employed, is coupled from the interface 15, via a data controller 15c, to a disk controller 17. Track and sector addresses are stored in a random access memory in the microprocesssor 15b. The buffer RAM 14 contains read/write data.

The disk controller 17 provides control over the rotary actuator motor 5e and the disk spindle motor 9 through the actuator/spindle driver 9b4. A spindle driver 9b41 in the actuator/spindle driver 9b4, responsive to the disk controller 17, initiates spinup of the disk assembly 7 and regulates the speed of the disk spindle motor 9. A position controller 9b42 and an amplifier 9b43 of the actuator/spindle driver 9b4, control the rotary actuator motor 5e in response to input from the disk controller 17, as to track count or to track number, which initiates track seeking. The position controller 9b42 and the amplifier 9b43 are part of a closed servo loop including a position sensor 9b44 which receives feedback as to magnetic head position, with respect to track crossings or to track numbers, during the seek mode of operation. In a multiple disk, disk memory, feedback may be derived from embedded servo code via a selected magnetic head 5b2, or may be derived from dedicated servo code via a dedicated magnetic head 5b21. When the count of track crossings or the track number matches that of the position controller 9b42, track seeking ends and track following begins.

In the track following mode, assuming no dedicated servo function, a selected magnetic head 5b2 senses bursts of embedded servo code in each track sector of the track being followed, senses data addresses and senses start of data codes. These signals, in the read/write channel, which includes the preamplifier 20 and the read/write amplifier 21, coupled to the interface 15, initiate the read or write function. Read data is transferred from the disk to the buffer RAM and write data is transferred from the buffer RAM to the disk under the control of the buffer controller 15d.

In the read/write channel, the preamplifier 20 functions as a transducer or head interface. Signals induced in the magnetic head from servo code, address codes or start of data codes are transmitted as pulses to the read/write amplifier 21. Here, signals derived from the embedded servo code are fed back to the position sensor 9b44 in the closed servo loop, by a pulse detector 21a, to maintain track following during traverse of the servo code field, and pulses resulting from address codes and start of data codes, are transmitted via a clock synchronizing phase locked loop 21b to a read decoder/write encoder circuit 21c. By way of explanation, the circuit 21b comprises a phase comparator at its input and a voltage controlled oscillator (VCO) at its output. These are coupled by a low pass filter and integrator. The circuit functions to extract the implied clock generator CG clock from the coded data stream. The decoder/encoder 21c translates data in the 1,7 or 2,7 code on the disk memory side of the system to the NRZ code on the interface/host computer side of the system. A data framing and control circuit 15e builds up a sector to be written or disassembles a sector which has been read. The sector, contains overhead information as well as data.

A connecter circuit 15f is employed to serialize/deserialize data. The serial data stream during reading is converted to parallel data. Data in parallel format which is to be written is converted to a serial data stream. Error correction circuitry also maybe advantageously utilized at this location.

By this comparison of FIGS. 1 and 7, the primary connections among the several electronic systems, memories, amplifiers, etc., are described. These, it will be appreciated, are embodied in printed circuit traces which are part of the printed circuit assembly 9b3. The details of such printed circuit designs are not essential to an enabling disclosure with respect to this invention.

Thus, this invention integrates the disk spindle motor 9 into the disk drive base and housing I and by bringing the printed circuit board assembly 9b3 within the disk drive housing 1, made possible by the unique design of the disk spindle motor 9, has also integrated the printed circuit board electronics with the disk drive motor 9, the actuator motor 5e and the magnetic head 5b2 within the housing 1, and, employs the disk drive base 1 and the printed circuit board assembly 9b3 as functional portions of the disk spindle motor 9. This saves fabrication cost, assembly cost and labor. By employing printed circuits on the printed circuit board assembly 9b3, particularly for the disk spindle motor windings 9b1, the need for wound coils within the disk spindle motor 9 has been eliminated and there is no separate external housing for the disk spindle motor 9 in this assembly, the motor housing is the disk drive base or housing and the motor stator 9b, including the printed circuit winding 9b1 is part of the printed circuit board assembly 9b3, also on the disk drive base within the housing 1.

The disk spindle motor design encourages the consolidation of all electronic and electrical functions into one common printed circuit board assembly 9b3. The substrate 9b2 of this printed circuit board assembly 9b3 is fabricated of a thin low-cost material (such as thin fiber-glass, polyimide, etc.) which can be bonded to the metal drive base 1 within the housing for support. The integrated circuit chips, connectors and other discreet electrical or electronic elements are bonded to this printed circuit substrate 9b2. A portion of this printed circuit substrate also serves as the disk spindle motor stator 9b, supporting the disk spindle motor windings 9b1.

This printed circuit substrate 9b2 can be batch fabricated at very low cost. It then accomplishes multiple functions: (1) electronics substrate, (2) spindle motor stator (3) connector substrate, (4) sole interconnection means for all electrical and electronic components, (5) all such circuit connections are within the housing 1 eliminating any need to penetrate the housing to access external circuit boards. The only foreign attachment to this batch fabricated part is the flexible cable 5f4 from the actuator arm assembly 5. If the substrate is polyimide, the flexible cable can be an appendage to the main substrate, thus eliminating the connections shown as 5f5.

The simplicity of the disk spindle motor design makes it much lower in cost than a conventional disk spindle motor. The only components needed beside the printed coil are: (1) a cartridge bearing assembly comprising the axial bearing pair 9a2 seen in FIG. 2, for example, (2) a magnet or a set of magnets 9a7, and (3) a disk motor rotor, preferably a bobbin-shaped rotor 9a which also serves as the flux path for the motor. The motor rotor 9a is inherently low in profile which is an indispensable feature for disk spindle motor applications in ultra thin disk drives.

This invention is applicable to optical, magneto optic and magneto resistive and other types of disk drives.

What is claimed is:

1. An axial gap electric motor, comprising:
   a. a support;
   b. a motor rotor comprising a hub and a pair of axially spaced rotor plates of magnetic material mounted to said hub;
   c. means for rotatably mounting said motor rotor to said support;
   d. means for producing alternately poled, substantially equally circumferentially spaced and substantially equally radially positioned, axial magnetic fields between said rotor plates, defining a predetermined number of magnetic poles;
   e. a printed circuit board comprising a printed circuit stator winding having radial winding sections formed on the circuit board in equally circumferentially distributed positions, at substantially the same radius defining a winding pattern of substantially circular planform, said printed circuit board having an opening therethrough substantially centrally of said circular planform of said printed circuit winding;
   f. means for mounting said printed circuit board to said support with said radial winding sections of said printed circuit stator winding positioned between said rotor plates in said alternately poled axial magnetic fields, said opening clearing said hub;
   g. means for producing an electrical indication of the polarity of an axial magnetic field at at least one predetermined location on said printed circuit stator winding, and
   h. means including a commutating circuit mounted to said printed circuit board, responsive to said electrical indication, for commutating electric power to said printed circuit stator winding.

2. The axial gap electric motor according to claim 1, in which:
   a. said means for producing axial magnetic fields comprises a circular permanent magnet ring secured concentrically of said hub to one of said rotor plates between said rotor plates, said permanent magnet ring having alternately poled, substantially equally circumferentially spaced, axially magnetized permanent magnet spots.

3. The axial gap electric motor according to claim 1, in which:
   a. said printed circuit board comprises opposite surfaces;
   b. said printed circuit stator winding comprises two printed circuit windings, each printed circuit winding comprising said radial winding sections, one printed circuit winding on each of said opposite surfaces of said printed circuit board, said printed circuit windings being of substantially identical patterns and being substantially in registration.

4. The axial gap electric motor according to claim 3, in which:
   a. said radial winding sections of each printed circuit winding are connected in series.

5. The axial gap electric motor according to claim 3, in which:
   a. adjacent radial winding sections of each printed circuit winding are connected in a closed loop.

6. the axial gap electric motor according to claim 1 comprising;
   a. printed circuits on said printed circuit board connecting said commutating circuit to said printed circuit stator winding, and
   b. said means for producing an electrical indication comprises a magnetic field sensor fixedly disposed adjacent a radial winding section in flux linkage with an axial magnetic field thereat for controlling said commutating circuit.

7. The axial gap electric motor according to claim 1, in which:
   a. the number of said radial winding sections is equal to the number of said axial magnetic fields.

8. A disk recording/reproducing device, comprising:
   a. a housing having a base;
   b. a disk motor having a disk motor rotor comprising a hub and a pair of axially spaced rotor plates of magnetic material on said hub;
   c. means for rotatably mounting said disk motor rotor on said base in said housing;
   d. means for concentrically mounting a disk of predetermined radial dimension to said disk motor rotor;
   e. means for producing alternately poled, circumferentially spaced, axial magnetic fields between said rotor plates adjacent the periphery of said rotor plates;
   f. a transducer;
   g. movable transducer actuator means including an actuator motor, said actuator motor having a stationary actuator motor part secured to said base, and a movable actuator motor part connected to said movable transducer actuator means, for providing movement of said transducer to different radial locations within the radial dimension of said disk;
   h. a printed circuit board having a printed circuit stator winding for said disk motor formed on a first part of said printed circuit board and electronic controls on a second part of said printed circuit board, said printed circuit board being disposed on said base in said housing with said printed circuit winding on said first part of said printed circuit board positioned between said rotor plates, an opening in said first part of said printed circuit board clearing said hub, said second part of said printed circuit board on said base in said housing clearing said transducer actuator means;

i. said printed circuit stator winding comprising radial winding sections disposed in circumferentially spaced positions in a substantially arcuate path in at least some of said axial magnetic fields, and j circuit means including printed circuits for connecting said electronic controls of said second part of said printed circuit board to said printed circuit stator winding, said actuator motor and said transducer for providing control thereof.

9. The disk recording/reproducing device as in claim 8, in which:

a. said means for producing axial magnetic fields comprises a circular permanent magnet ring secured concentrically of said hub to one of said rotor plates between said rotor plates, said permanent magnet ring having alternately poled, substantially equally spaced, axially magnetized permanent magnet spots producing said axial magnetic fields between said rotor plates.

10. The disk recording/reproducing device as in claim 8, in which:

a. said movable actuator motor part comprises a printed circuit winding.

11. The disk recording/reproducing device as in claim 8, comprising:

a. a commutating circuit on said printed circuit board;
b. printed circuit traces on said printed circuit board connecting said commutating circuit to said printed circuit stator winding, and
c. a magnetic field sensor fixedly disposed adjacent a radial winding section in flux linkage with axial magnetic fields moving therepast during rotation of said motor rotor for controlling said commutating circuit.

12. A disk drive comprising:

a. a housing having a base;
b. a memory disk;
c. a bobbin shaped disk spindle motor rotor comprising a hub and a pair of axially spaced rotor plates of magnetic material on said hub;
d. means for rotatabley mounting said bobbin shaped motor rotor to said base within said housing;
e. means for concentrically mounting said memory disk to be driven by said motor rotor;
f. a circular magnetic ring concentrically disposed of said hub on one of said rotor plates between said rotor plates, said magnetic ring being spot magnetized in equally circumferentially spaced locations to produce alternately poled, axial permanent magnet fields between said rotor plates;
g. a transducer;
h. a movable actuator on said base within said housing, mounting said transducer for movement to different radial locations across said memory disk;
i. an actuator motor having a stator mounted to said base within said housing and having an actuator motor winding mounted to said movable actuator, for moving said actuator;

j. an electronic circuit board secured to said base within said housing, a portion of said electronic circuit board being disposed between said rotor plates of said bobbin shaped motor rotor;
k. a disk spindle motor winding including a printed circuit stator winding formed on said portion of said electronic circuit board which is disposed between said rotor plates of said bobbin shaped motor rotor, said disk spindle motor winding having radial winding portions disposed between said rotor plates of said bobbin shaped motor rotor to be linked by said axial magnetic fields;
I. electronic means mounted to said electronic circuit board for controlling said disk drive, and
m. circuits connecting said actuator motor winding, said disk spindle motor winding and said transducer to said electronic means within said housing.

13. The disk recording/reproducing device as in claim 12, in which:

a. said movable actuator is a rotary actuator.

14. The disk recording/reproducing device as in claim 12, in which:

a. said actuator motor is an axial gap motor having a permanent magnet stator mounted to said base.

15. The disk recording/reproducing device as in claim 12, in which:

a. said electronic circuit board is a printed circuit board and said disk spindle motor winding is a printed circuit winding having continuous printed circuit winding sections on both sides of said portion of said printed circuit board;
b. said printed circuit windings each comprising radial winding sections in said axial magnetic fields;
c. said device further comprises a commutating circuit mounted to said printed circuit board;
d. printed circuit traces connecting said commutating circuit to said printed circuit winding sections of said printed circuit winding, and
e. a magnetic field sensor fixedly disposed adjacent a radial winding section in flux linkage with axial magnetic fields moving therepast during rotation of said motor rotor for controlling said commutating circuit.

16. A disk drive, comprising:

a. a housing having a support within said housing;
b. a bobbin shaped disk motor rotor having axially spaced rotor plates of magnetic material;
c. means for producing alternately poled, circumferentially spaced, axial magnetic fields between said rotor plates;
d. means for rotatabley mounting said bobbin shaped disk motor rotor on said support within said housing;
e. a printed circuit board secured to said support within said housing;
f. a printed circuit motor stator winding formed on said printed circuit board and disposed between said rotor plates of said bobbin shaped disk motor rotor;
g. a memory disk concentrically connected to said bobbin shaped disk motor rotor to be rotated thereby;
h. a transducer/actuator assembly movably mounted on said support within said housing;
i. an actuator motor having a permanent magnet stator mounted to said support within said housing and a coil mounted to said transducer/actuator assembly for moving said transducer/actuator assembly to move said transducer to different radial locations across said memory disk;
j. electronic elements mounted to said printed circuit board, and
k. circuits, comprising printed circuit traces, connecting said printed circuit motor stator winding, said coil and said transducer to said electronic elements.

17. An axial gap electric motor, comprising:
a. a support;
b. a motor rotor comprising a hub and a pair of axially spaced rotor plates of magnetic material on said hub;
c. means for rotatably mounting said motor rotor on said support;
d. means for producing alternately poled, substantially equally circumferentially spaced and substantially equally radially positioned, axial magnetic fields between said rotor plates;
e. a printed circuit board having a printed circuit stator winding formed thereon;
f. means for mounting said printed circuit board on said support with said printed circuit stator winding disposed between said rotor plates, said printed circuit board having an opening therethrough clearing said hub, and
g. said printed circuit stator winding comprising radial winding sections encircling said hub in substantially uniformly circumferentially distributed positions in said axial magnetic fields.

18. A disk recording/reproducing device, comprising:
a. a housing;
b. a disk assembly comprising a disk having a surface, and a disk motor for rotating said disk, said disk motor having a disk motor rotor comprising a pair of axially spaced rotor plates of magnetic material;
c. means for rotatably mounting said disk motor rotor and said disk assembly in said housing;
d. means for producing alternately poled, axial magnetic fields in circumferentially spaced positions between said rotor plates adjacent the periphery thereof;
e. a transducer actuator assembly movably mounted in said housing for positioning said transducer over said surface of said disk;
f. an actuator motor in said housing for moving said transducer actuator assembly to move said transducer to different radial locations with respect to said surface of said disk;
g. a printed circuit board having electronic controls thereon in one printed circuit board area and a printed circuit stator winding, formed thereon, for said disk motor, in a different printed circuit board area;
h. means for mounting said printed circuit board within said housing with said printed circuit stator winding positioned between said axially spaced rotor plates in said axial magnetic fields, and
i. circuit means on said printed circuit board, including printed circuits, connecting said electronic controls to said printed circuit stator winding, to said actuator motor and to said transducer.

* * * * *